UNITED STATES PATENT OFFICE 2,046,254

VAT DYESTUFFS DERIVED FROM ACEANTHRENEQUINONE AND PROCESS OF PREPARING THEM

Wilhelm Eckert and Heinrich Sieber, Frankfort-on-the-Main-Hochst, Germany, assignors to General Aniline Works, Inc., New York, N. Y., a corporation of Delaware No Drawing. Application June 10, 1933, Serial No. 675,331. In Germany June 14, 1932

13 Claims. (Cl. 260—29)

The present invention relates to vat dyestuffs and to a process of preparing them.

We have found that new vat dyestuffs are obtainable by melting with a caustic alkali a compound which is obtainable by condensing an aceanthrenequinone with a 1,2-diamino-compound and which has the general probable formula:

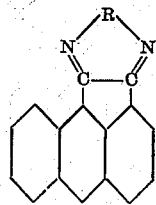

wherein =N—R—N= means the 1,2-diamino-radical, R being a radical of the aliphatic, alicyclic, and aromatic series. The dyestuffs thus obtained may be halogenated.

The constitutions of the new dyestuffs thus obtained are unknown.

The following examples serve to illustrate the invention, but they are not intended to limit it thereto, the parts being by weight, unless otherwise stated:

(1) 10 parts of the condensation product from aceanthrenequinone with 1,2-diaminobenzene of the following formula:

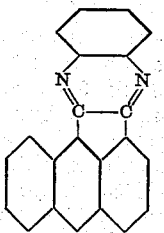

are introduced at about 100° C. into a mixture of 100 parts of caustic potash and 70 parts of alcohol. The temperature is gradually raised to 150° C. to 160° C. and maintained for about half an hour. The reaction mass is then poured into water, the dyestuff which has been precipitated, is filtered by suction, washed until neutral and dried. It forms a green, amorphous powder which is very difficultly soluble in the usual organic solvents. It dissolves in concentrated sulfuric acid to an olive solution. The dyestuff dyes cotton from a green vat green tints of very good fastness properties.

(2) 30 parts of the condensation product from aceanthrenequinone with 2-chloro-4,5-diaminotoluene, which corresponds to one of the following formulae or which is a mixture of the products of the following formulae:

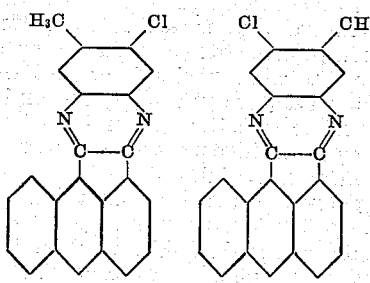

are introduced into a mixture of 200 parts of caustic potash and 200 parts by volume of alcohol and the whole is heated at 150° C. to 160° C. The color of the mass turns green, while the mass froths. After 20 minutes the formation of the dyestuff is finished. The mass is diluted with water and worked up in known manner. The dyestuff thus obtained dyes cotton green tints.

(3) Aceanthrenequinone may easily be condensed with ethylene-1,2-diamine in alcohol to form an azine of the following constitution:

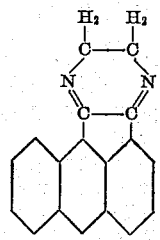

The said azine is molten in a manner analogous to that described in Examples 1 or 2, to form a green vat dyestuff which dyes cotton green tints of a bluish hue.

(4) Methyl-aceanthrenequinone (obtainable from 2-methylanthracene and oxalylchloride) is condensed to an azine by heating in glacial acetic acid with 1,2-diaminobenzene. 10 parts of the said condensation product are melted at 150° C. to 170° C. with 100 parts of caustic potash and 70 parts of alcohol. The formation of the dyestuff is finished after half an hour. The yield is nearly quantitative.

The dyestuff dyes cotton from a green vat green tints.

(5) By treating the condensation product from aceanthrenequinone and 1-methyl-3,4-diaminobenzene which corresponds to one of the following formulæ or which contains products of both formulæ:

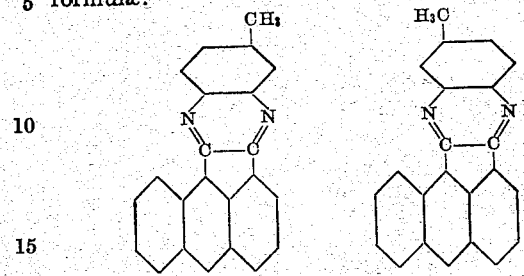

in a manner as described in Example 1, a green vat dyestuff is obtained.

(6) 6 parts of the dyestuff as it is obtained according to Example 1, are suspended in as fine a form as possible in 70 parts by volume of nitrobenzene. In the course of two hours 35 parts of bromine are gradually dropped in, while stirring, at 40° C. to 50° C. and the whole is maintained at this temperature for further 5 hours. The bromination product thus formed is then filtered by suction, the solid matter is washed with alcohol and subsequently with water and dried. The dyestuff dyes cotton green tints having a purer shade than the dyeings obtained by means of the starting material.

(7) 23 parts of aceanthrenequinone are heated to boiling for 2 to 3 hours with 21 parts of 1,2-diamino-naphthalene (hydrochloride) in 230 parts by volume of pyridine. The azine thus formed which corresponds with one of the following formulæ or which is a mixture of the products of the following formulæ:

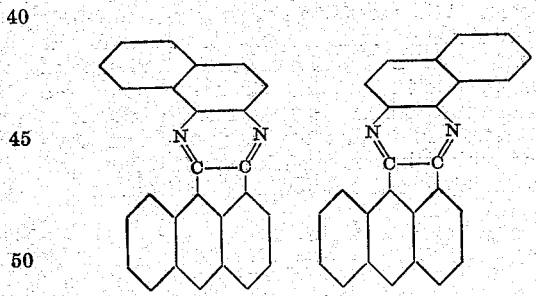

is filtered by suction, washed with pyridine and subsequently with water.

20 parts of the said condensation product are introduced at about 100° C. into a melt consisting of about 150 parts of caustic potash and 70 parts by volume of alcohol and the temperature is raised to about 170° C. When the formation of the dyestuff is finished, the melt is allowed to cool and diluted with water. The dyestuff thus precipitated is filtered by suction, washed with water until neutral and dried. It forms a dark green powder which dissolves in concentrated sulfuric acid to a violet solution. It melts at above 300° C.; it is very difficultly soluble in the usual organic solvents, even in the heat.

The dyestuff dyes cotton from a green vat clear yellowish-green tints of very good fastness properties.

(8) By melting under the same or similar conditions the condensation product from aceanthrenequinone and 2,3-diamino-fluorenone which corresponds with one of the following formulæ or which is a mixture of the products of the following formulæ:

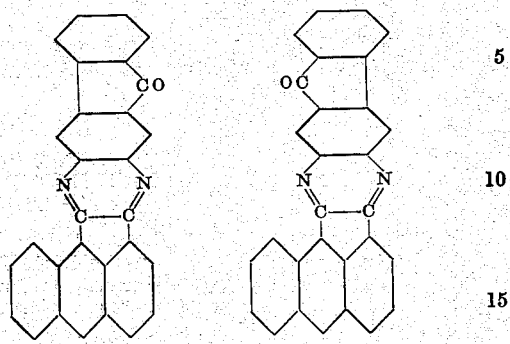

with caustic potash and alcohol, a dyestuff is obtained the dyeings of which have a more bluish tint than those of the dyestuff described in Example 7.

We claim:

1. The process which comprises melting with a caustic alkali a compound which is obtainable by condensing an aceanthrenequinone with a 1,2-diamino compound and which has the general formula:

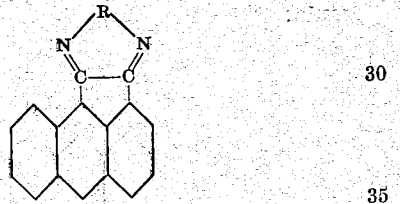

wherein =N—R—N= means the 1,2-diamino-radical, R being a radical of the aliphatic, benzene, naphthalene and fluorene series.

2. The process which comprises melting with a caustic alkali a compound which is obtainable by condensing an aceanthrenequinone with a 1,2-diamino-compound and which has the general formula:

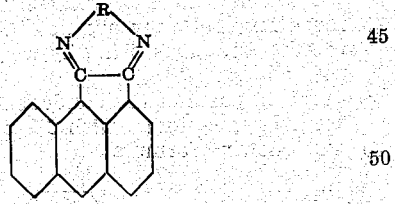

wherein =N—R—N= means the 1,2-diamino-radical, R being a radical of the aliphatic, benzene, naphthalene and fluorene series and halogenating the compound thus obtained.

3. The process which comprises melting with a caustic alkali a compound which is obtainable by condensing an aceanthrenequinone with an ortho-diamino compound of the benzene series and which has the general formula:

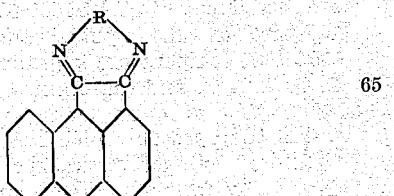

wherein =N—R—N= means the 1,2-diamino-radical, R being a radical of the benzene series.

4. The process which comprises melting with a caustic alkali a compound which is obtainable by condensing an aceanthrenequinone with an ortho-diamino compound of the benzene series and which has the general formula:

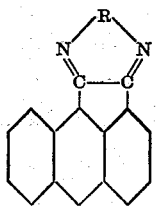

wherein =N—R—N= means the 1,2-diamino-radical, R being a radical of the benzene series, and halogenating the compound thus obtained.

5. The process which comprises melting at about 150° C. to about 170° C. with potassium hydroxide in the presence of ethyl alcohol a compound which is obtainable by condensing an aceanthrenequinone with an ortho-diamino compound of the benzene series and which has the general formula:

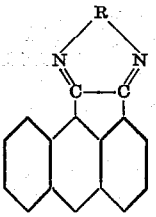

wherein =N—R—N= means the 1,2-diamino-radical, R being a radical of the benzene series.

6. The process which comprises melting at about 150° C. to about 170° C. with potassium hydroxide in the presence of ethyl alcohol a compound which is obtainable by condensing an aceanthrenequinone with an ortho-diamino-compound of the benzene series and which has the general formula:

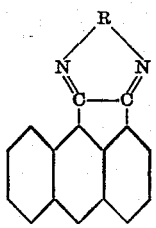

wherein =N—R—N= means the 1,2-diamino-radical, R being a radical of the benzene series, and halogenating the compound thus obtained.

7. The process which comprises melting at about 150° C. to about 160° C. with potassium hydroxide in the presence of ethyl alcohol a compound which is obtainable by condensing aceanthrenequinone with 1,2-diaminobenzene and which has the formula:

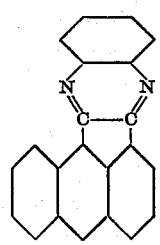

8. The process which comprises melting at about 150° C. to about 160° C. with potassium hydroxide in the presence of ethyl alcohol a compound which is obtainable by condensing aceanthrenequinone with 1,2-diaminobenzene and which has the formula:

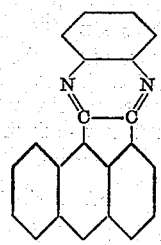

isolating the dyestuff thus obtained and treating its suspension in nitrobenzene with bromine at about 40° C. to about 50° C.

9. The compounds substantially identical with those which are obtainable by the process which comprises melting with a caustic alkali a compound which is obtainable by condensing an aceanthrene with a 1,2-diamino compound and which has the general formula:

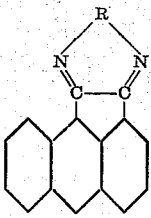

wherein =N—R—N= means the 1,2-diamino-radical R being a radical of the aliphatic, benzene, naphthalene and fluorene series.

10. The compounds substantially identical with those which are obtainable by the process which comprises melting with a caustic alkali a compound which is obtainable by condensing an aceanthrenequinone with a 1,2-diamino compound and which has the general formula:

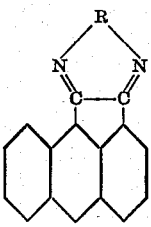

wherein =N—R—N= means the 1,2-diamino-radical, R being a radical of the aliphatic, benzene, naphthalene and fluorene series and halogenating the compound thus obtained.

11. The compound substantially identical with that which is obtainable by the process which comprises melting at about 150° C. to about 160° C. with potassium hydroxide in the presence of ethyl alcohol a compound which is obtainable by condensing aceanthrenequinone with 1,2-diamino-benzene and which has the formula:

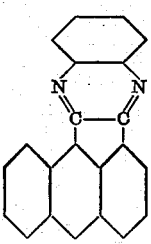

forming a green amorphous powder being very difficultly soluble in the usual organic solvents, dissolving in concentrated sulfuric acid to an olive solution and dyeing cotton from a green vat green tints of very good fastness properties.

12. The compound substantially identical with that which is obtainable by the process which comprises melting at about 150° C. to about 160° C. with potassium hydroxide in the presence of ethyl alcohol a compound which is obtainable by condensing aceanthrenequinone with 1,2-diamino-benzene and which has the formula:

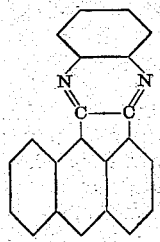

isolating the dyestuff thus obtained and treating its suspension in nitrobenzene with bromine at about 40° C. to about 50° C., said compound being a dyestuff dyeing cotton clear green tints of very good fastness properties.

13. The compound substantially identical with that which is obtainable by the process which comprises melting at about 170° C. with potassium hydroxide in the presence of ethyl alcohol a compound which is obtainable by condensing aceanthrenequinone with 1,2-diamino-naphthalene and which has the formula:

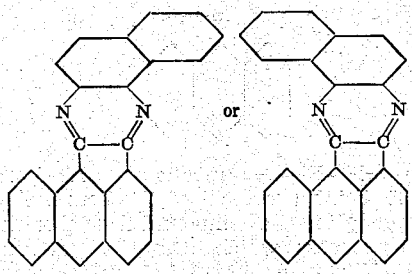

or is a mixture of compounds of these formulae, forming a green powder which dissolves in concentrated sulfuric acid to a violet solution and dyeing from a green vat cotton clear yellowish-green tints of very good fastness properties.

WILHELM ECKERT.
HEINRICH SIEBER.